(12) United States Patent
Kimball et al.

(10) Patent No.: US 10,567,643 B2
(45) Date of Patent: Feb. 18, 2020

(54) DIRECTIONAL ANIMATION DISPLAYS DURING IMAGE CAPTURE

(71) Applicant: Motorola Mobility LLC, Chicago, IL (US)

(72) Inventors: Ryan William Kimball, Chicago, IL (US); Lauren Elizabeth Schwendimann, Evanston, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/900,736

(22) Filed: Feb. 20, 2018

(65) Prior Publication Data

US 2019/0260926 A1   Aug. 22, 2019

(51) Int. Cl.
*H04N 5/232* (2006.01)
*G06T 13/80* (2011.01)

(52) U.S. Cl.
CPC ......... *H04N 5/23222* (2013.01); *G06T 13/80* (2013.01); *H04N 5/23216* (2013.01); *H04N 5/23219* (2013.01); *H04N 5/23293* (2013.01); *G06T 2200/24* (2013.01)

(58) Field of Classification Search
CPC ........... H04N 5/23222; H04N 5/23216; H04N 5/23219; H04N 5/23293; G06T 13/80
See application file for complete search history.

(56) References Cited

U.S. PATENT DOCUMENTS 9,344,673 B1 * 5/2016 Buchheit ................ H04N 7/144
2016/0323503 A1 * 11/2016 Wada ................ H04M 1/72522

* cited by examiner

*Primary Examiner* — Nicholas G Giles
(74) *Attorney, Agent, or Firm* — SBMC

(57) ABSTRACT

Techniques described herein display a directional animation during image capture. At least some implementations detect an image capture event associated with capturing an image. In response to detecting the image capture event, a directional animation that includes moving images is displayed, where the moving images are based on a location associated with a camera being used to capture the image. Various implementations detect a termination event and terminate display of the directional animation.

20 Claims, 10 Drawing Sheets

DIRECTIONAL ANIMATION DISPLAYS DURING IMAGE CAPTURE

BACKGROUND

Computing devices with integrated cameras provide users with the ability to capture images without accessing a separate camera device. To take a picture, users activate camera functionality of the device, and direct the corresponding lens towards a scene they wish to capture, such as directing a front-facing camera towards themselves to take a self-image, also known as a "selfie". However, integrated cameras are oftentimes small relative to the overall size of the corresponding computing device and/or blend in with a surrounding setback, thus making it difficult for users visually locate the lens. Other times, the lens provides a real-time display of images in view of the lens. Each of these scenarios presents a challenge that can cause the user's gaze to be directed elsewhere than the lens, which can result in a less than desirable image capture.

BRIEF DESCRIPTION OF THE SEVERAL VIEWS OF THE DRAWINGS

While the appended claims set forth the features of the present techniques with particularity, these techniques may be best understood from the following detailed description taken in conjunction with the accompanying drawings of which:

DETAILED DESCRIPTION

Figure 1:
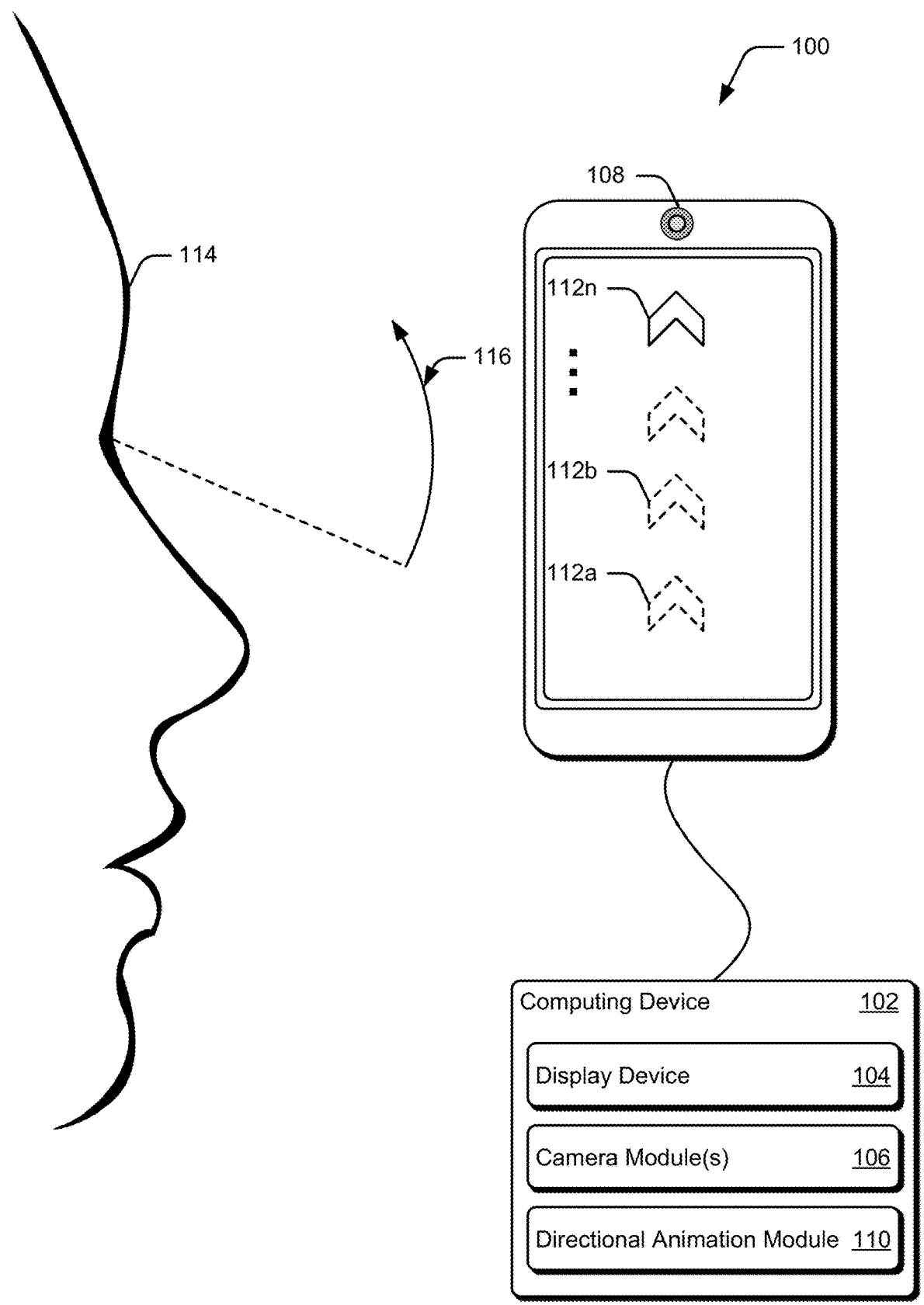
FIG. 1 is an overview of a representative environment that includes an example of directional animations for image capture in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Techniques described herein display a directional animation during image capture. At least some implementations detect an image capture event associated with capturing an image. In response to detecting the image capture event, a directional animation that includes moving images is displayed, where the moving images are based on a location associated with a camera being used to capture the image. Various implementations detect a termination event and terminate display of the directional animation.

Consider now an example environment in which various aspects as described herein can be employed.

Example Environment

FIG. 1 illustrates an example environment 100 in accordance with one or more implementations. Environment 100 includes computing device 102 in the form of a mobile communication device that includes image capture capabilities. Accordingly, computing device 102 includes a display device 104 and a camera module(s) 106.

Display device 104 represents any suitable type of device that can be used to render images, such as an organic light-emitting diode (OLED) display, Liquid Crystal Display (LCD), a light-emitting diode display (LED), an electroluminescent display (ELD), a plasma display panel (PDP), and so forth. In some implementations, display device 104 include touch input capabilities, where input can be received through physical interactions with the display device (e.g., fingers, styluses, etc.). Various implementations use combinations of hardware, firmware and/or software to generate a device capable of rendering content. For example, computing device 102 can include a device driver that programmatically controls and/or drives hardware used to render content via display device 104.

Camera modules 106 represent any suitable type of image capture device. In environment 100, camera modules 106 include a front-facing camera 108 in which the camera lens resides on a same side as display device 104 effective to receive light and images directed towards the front of display device 104. Alternately or additionally, camera modules 106 include a rear-facing camera module that positions a camera on the opposite/back side of the display device to receive light and images directed towards the back of display device 104 and/or computing device 102. Thus, computing device 102 can include multiple cameras at different positions that can be activated to capture images from different angles.

Computing device 102 also includes directional animation module 110 that identifies the activation of a front-facing camera for image capture and/or user-initiation of an image capture. Various implementations of directional animation module 110 alternately or additionally include facial recognition algorithms that analyze live images generated by camera modules 106 to identify various characteristics about the live images. In response to identifying these various image capture events, directional animation module 110 plays a directional animation that draws a user's eye towards the corresponding lens. The phrase "directional animation" denotes a computer-generated animation that includes moving images, where the moving images are based upon a location and/or move in a direction associated with camera modules 106.

In some implementations, directional animation module 110 determines how a directional animation is played, such as through the use of various playback parameters. As one example, various playback parameters can configure the playback of an animation to be timed and/or synchronized to an image capture moment. For example, in environment 100, directional animation module 110 displays an animation that includes chevron 112a, chevron 112b, to chevron 112n, where n represents an arbitrary number. The animation creates a visual pattern and/or animation of a moving chevron that advances across display device 104 and towards the lens of front-facing camera 108. Accordingly, the animation first displays or highlights chevron 112a, which is positioned at an opposite side of the display device from the lens. After a predetermined amount of time, the animation visually removes or un-highlights chevron 112a, and displays or highlights chevron 112b. This process repeats through each respective chevron on the display, until reaching chevron 112n, thus giving the visual appearance of a chevron moving across the display and towards the camera lens. Some implementations time the display of the animation such that the image closest to the lens relative to other images (e.g., chevron 112n) displays at a moment the camera captures the image. As another example, directional animation module 110 can apply a playback parameter that indicates other types of termination events, such as a repeat count of the animation (e.g., repeats cycling through the chevrons), various image capture events (e.g., repeat until an image is captured, repeat until front-facing camera 108 is no longer activated for image capture, etc.), a timer expiration, and so forth. While described in the context of an animation that cycles through various chevrons, it is to be appreciated that any other suitable type of animation can be displayed by directional animation module 110 as further described herein. Thus, directional animation module 110 influences what type of directional animation, as well as how the animation is played.

Environment 100 includes user 114 attempting to capture a selfie using the front facing camera. Accordingly, user 114 views the animation displayed by directional animation module 110, which draws the eye of user 114 generally in direction 116 from the bottom edge of computing device 102 to the upper edge of computing device 102 where front-facing camera 108 resides. In turn, this improves the probability of capturing an image in which the user's eyes are directed to the lens relative to image captures performed without the animation.

Figure 2:
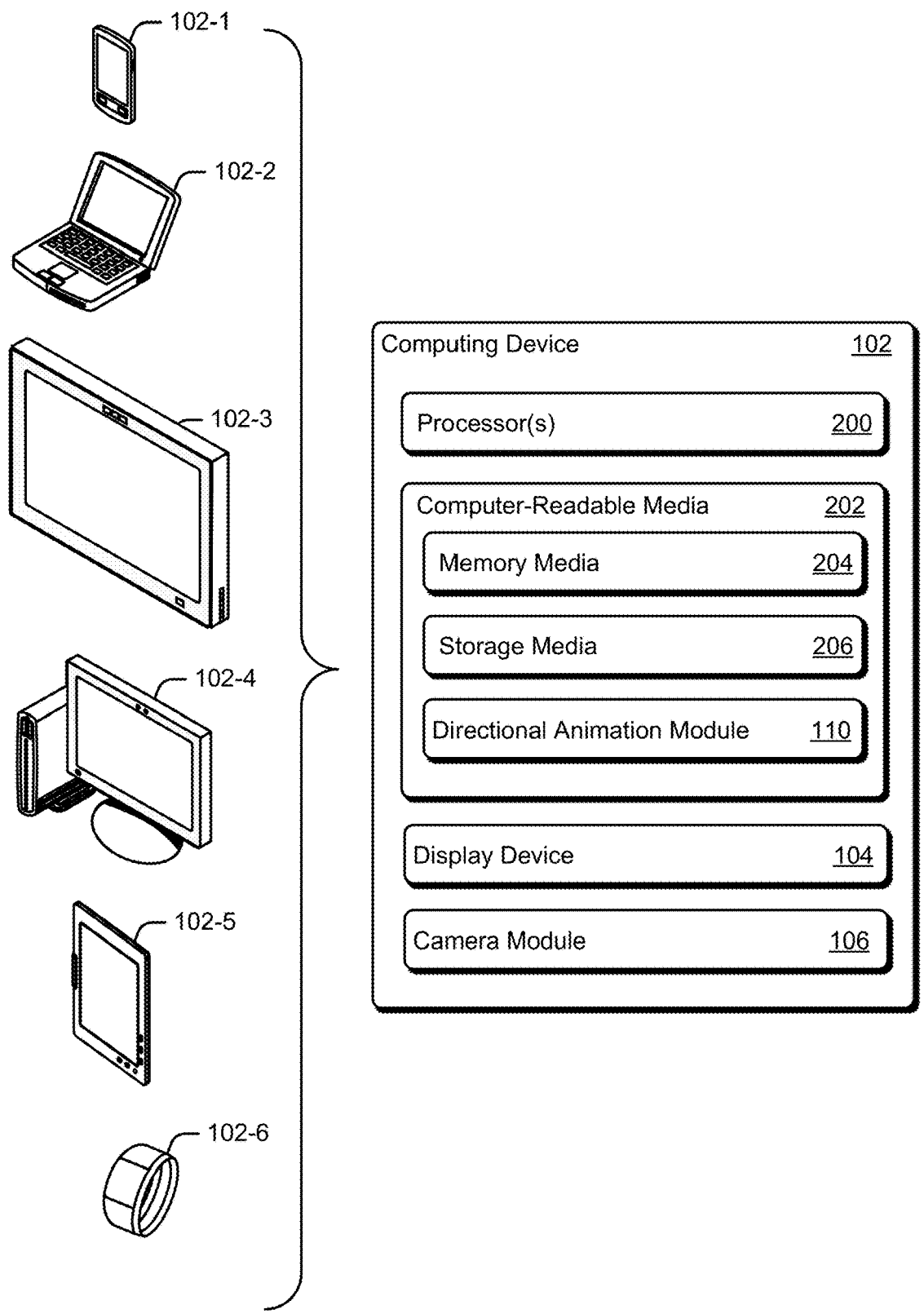
FIG. 2 illustrates a more detailed example of devices that can be used for displaying directional animations during image capture in accordance with one or more implementations.

FIG. 2 illustrates an expanded view of computing device 102 of FIG. 1 with various non-limiting example devices including: smartphone 102-1, laptop 102-2, television 102-3, desktop 102-4, tablet 102-5, and smart watch 102-6. Accordingly, computing device 102 represents any mobile device, mobile phone, client device, wearable device, tablet, computing, communication, entertainment, gaming, media playback, and/or other type of electronic device that includes image capture as further described herein. A wearable device may include any one or combination of a watch, armband, wristband, bracelet, glove or pair of gloves, glasses, jewelry items, clothing items, any type of footwear or headwear, and/or other types of wearables.

Computing device 102 includes processor(s) 200 and computer-readable media 202, which includes memory media 204 and storage media 206. Applications and/or an operating system (not shown) embodied as computer-readable instructions on computer-readable media 202 are executable by processor(s) 200 to provide some, or all, of the functionalities described herein. For example, various embodiments can access an operating system module that provides high-level access to underlying hardware functionality by obscuring implementation details from a calling program, such as protocol messaging, register configuration, memory access, and so forth.

Computer-readable media 202 includes directional animation module 110 of FIG. 1. While illustrated here as residing on computer-readable media 202, other implementations can alternately or additionally implement directional animation module 110 using hardware, firmware, software, or any combination thereof.

Computing device 102 also includes display device 104 and camera modules 106 of FIG. 1. As further described herein, display device 104 provides computing device 102 with the ability to render images, such as a live image from a camera and/or a directional animation, while camera modules 106 provide the ability to capture images.

Having described an example operating environment in which various aspects of directional animations can be utilized, consider now a discussion of image captures using directional animations in accordance with one or more implementations.

Image Captures Using Directional Animations

Computing devices with integrated cameras provide users with mobile access to image capturing features without carrying multiple devices. As one example, users often carry mobile communication devices with them throughout the day to maintain connectivity, such as texting, Internet access, voice communications, and so forth. By including an integrated camera, the mobile communication device provides the user with the ability to capture images along with connectivity, thus simplifying the user's access to these various features. However, users oftentimes desire mobile communication devices with sizes and forms that make carrying the device less burdensome. Accordingly, these sizes and forms can affect and/or restrict how much space is dedicated to an integrated camera, since users oftentimes desire compact and light devices. As an example, manufactures may choose cameras with smaller sizes relative to the overall device, thus making it difficult to find the lens. For example, consider an example of a mobile communication device that includes a front-facing camera. Various implementations not only use a camera lens that is small relative to the overall size of the mobile communication device, but place the camera lens in a setback of similar color, which further obscures the lens. Accordingly, in images captured using the front-facing camera, such as a selfie, users oftentimes have a difficult time locating what direction to focus on, which can result in image captures where the user is looking elsewhere than directly at the camera lens.

Figure 3:
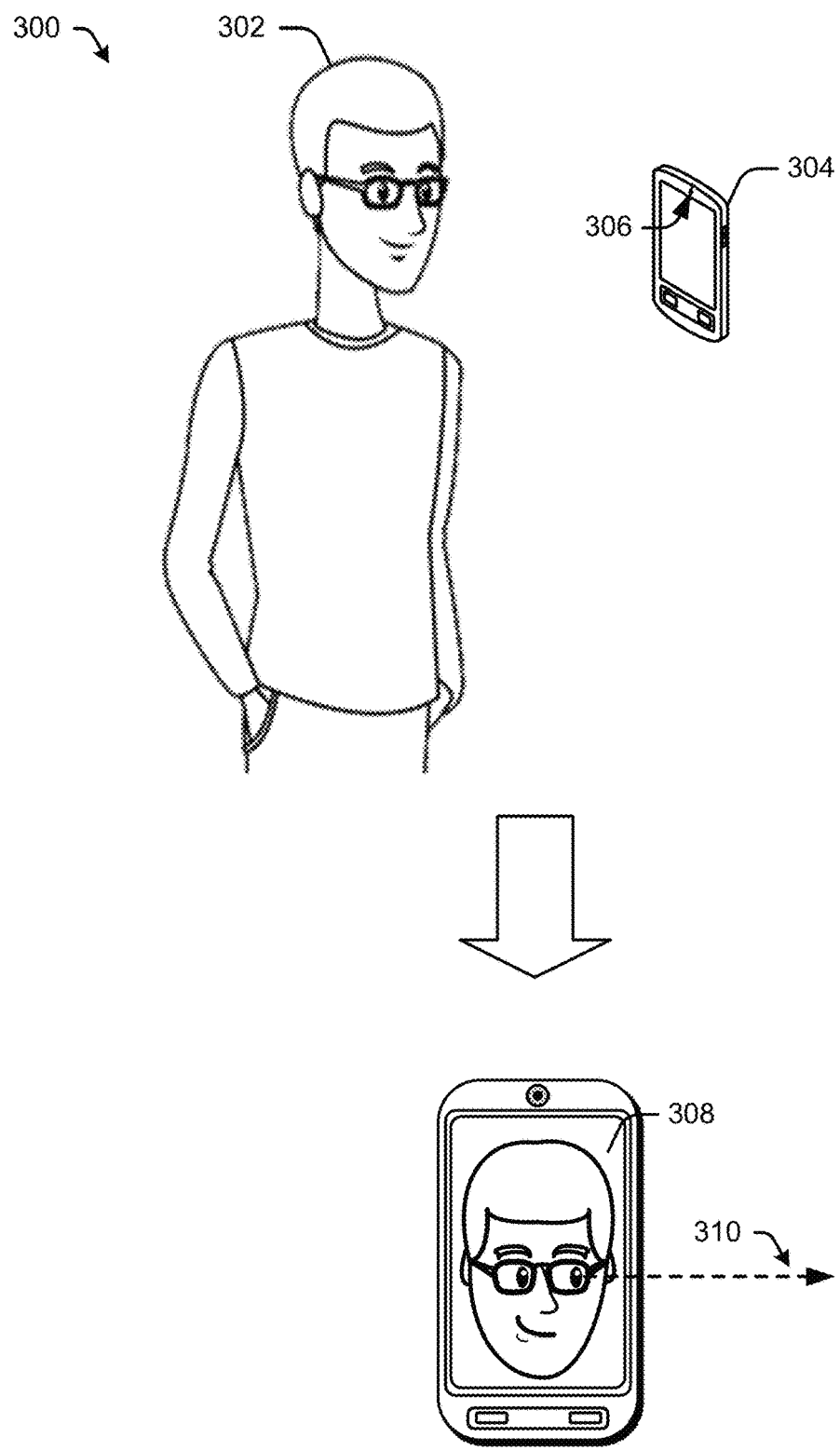
FIG. 3 illustrates an example image capture in accordance with one or more implementations.

To demonstrate, consider FIG. 3 that illustrates environment 300 that includes user 302 and mobile communication device 304. In the upper portion of FIG. 3, user 302 is engaged with front-facing camera 306 of the mobile computing device by capturing a selfie. Unfortunately, user 302 fails to look directly at the lens corresponding to front-facing camera 306 for various reasons, such as the lens being obscured from view, user 302 being distracted to look elsewhere, and so forth. As shown in the lower portion of FIG. 3, this results in an image capture 308 where the user's gaze 310 has drifted from center and/or from looking directly at the camera during the image capture. This can frustrate the user, and cause them to repeatedly attempt to capture a selfie with an improved image (e.g., an image in which they are looking directly at the camera).

Various implementations display a directional animation during image capture. At least some implementations detect an image capture event associated with capturing an image. This can include detecting activation of a particular camera, activation of an image capture control, a gaze direction of a face included in a live image, and so forth. In response to detecting the image capture event, various implementations display a directional animation that includes moving images, where the moving images are based on a location associated with a camera being used to capture the image, such as a location within a predetermined distance or proximity of the camera. The directional animation can be displayed until a termination event is detected, at which point the display of the directional animation is terminated.

Figure 4:
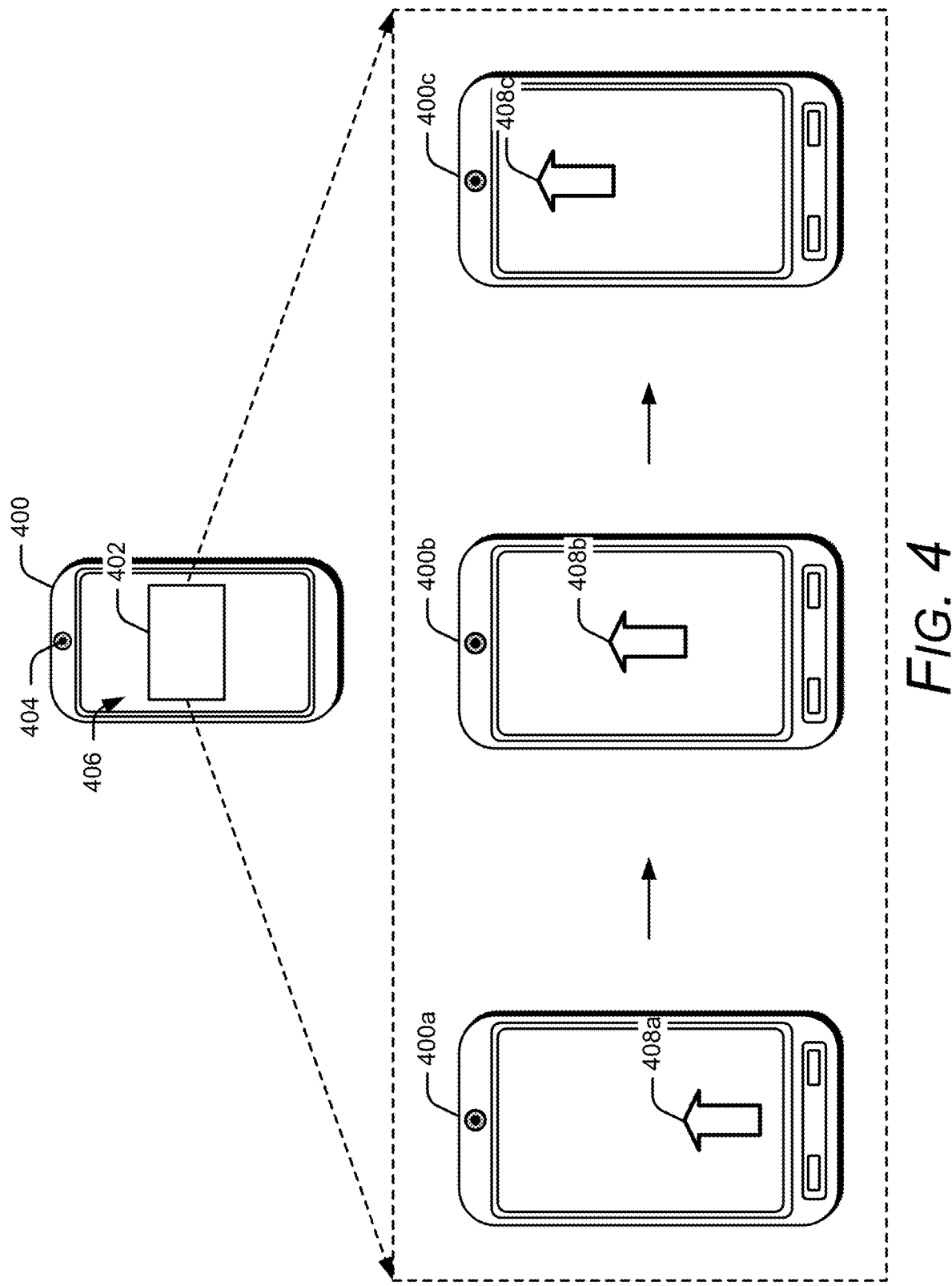
FIG. 4 illustrates an example directional animation used during image capture in accordance with one or more implementations.

To demonstrate, consider now FIG. 4 that illustrates an example directional animation in accordance with one or more embodiments. FIG. 4 includes computing device 400, which is representative of computing device 102 of FIG. 1. In FIG. 4, computing device 400 displays directional animation 402 to provide a visual cue that directs a user's attention or eye to a camera lens. To illustrate the animated nature of directional animation 402, the lower portion of FIG. 4 includes a sequential view of computing device 400 at various points in time. In other words, computing device 400a represents a view of computing device 400 at a first point in time, computing device 400b represents a view of computing device 400 at a second point time, followed by computing device 400c at a third point in time.

In FIG. 4, computing device 400 displays directional animation 402 in response to detecting an image capture event. The image capture event can be any suitable type of event and/or user input corresponding to an image capture. One example of an image capture event includes receiving user input associated with activating front-facing camera 404. Alternately or additionally, an image capture event can include receiving user input associated with performing an image capture, such as selection of an image capture control and/or camera shutter control that initiates the image capture process. As yet another example, the image capture event can include the identification of image characteristics extracted from live images. For instance, various implementations use facial recognition algorithms to process live images generated by the camera to identify facial characteristics, such as a gaze, that can trigger the display of a directional animation. As an example, FIG. 3 demonstrates an image capture 308 where the user's gaze 310 is directed elsewhere than directly at the lens. Various implementations use facial recognition algorithms to identify that gaze 310 is not directed towards the camera lens, and trigger the display of a directional animation as a way to draw the user's gaze back to center and/or the camera lens.

Directional animation 402 visually provides a computer-generated image that draws the user's eye towards the image capture mechanism (e.g., front-facing camera 404). In this example, directional animation 402 displays an arrow that moves across display 406 towards front-facing camera 404. Accordingly, computing device 400a, by way of directional animation 402, first displays arrow 408a at a position on the display device that is opposite of the front-facing camera lens: at the bottom edge of the display while front-facing camera 404 is positioned at the top edge. Over time, the arrow moves across the display towards the camera such that arrow 408b moves towards the middle of the top edge as illustrated by computing device 400b. In computing device 400c, playback of directional animation 402 completes by moving arrow 408c into a top-most position that corresponds to the closest location to the camera relative to the other animation image locations (e.g., arrow 408a and arrow 408b). For discussion purposes, directional animation 402 displays the arrows as three discrete images that move an arrow across a display, but alternate or additional implementations can use any suitable number of discrete images to generate an animation.

Some implementations visually repeat playback of the directional animation such that the images reset and repeat. In other words, after directional animation 402 completes with arrow 408c positioned at the top-most location associated with the front-facing camera, the playback repeats such that arrow 408c is visually removed from the display, and the directional animations starts over to display arrow 408a, followed by arrow 408b, and then arrow 408c. How often playback of the directional animation repeats can be determined in any suitable manner. Some implementations repeat playback for a predetermined number of cycles, where a cycle corresponds to one full cycle of the directional animation (e.g., the display of arrow 408a through arrow 408c). Alternately or additionally, various implementations initiate a timer for a predetermined time period, and repeat the animation until the timer expires. For example, in a scenario in which computing device 400 plays directional animation 402 in response to the activation of front-facing camera 404, some implementations start a timer that governs how long playback of directional animation 402 is repeated. As another example, computing device 400 can display directional animation 402 in response to detecting activation of the front-facing camera, and repeat displaying the animation until an image capture control is activated to capture an image. After detecting activation of the image capture control, various implementations continue playback of the directional animation for a predetermined time period, thus extending the display of the directional animation after the initiation of an image capture. In some implementations, detection activation of the image capture control initiates playback of the directional animation. Thus, the initiation, repetition, and/or duration of directional animation 402 playback can be influenced by any number of factors, examples of which are provided herein.

In displaying directional animation 402, some implementations of computing device 400 overlay the animation images on top of a live image being captured from a camera. To illustrate, recall the scenario described with respect to FIG. 3 in which user 302 is actively capturing a selfie. Some computing devices provide user 302 with a live image generated by the front-facing camera such that the user sees a live image of themselves on the display of mobile communication device 304 prior to capturing a still image. Various implementations overlay directional animation 402 on top of the live image such that the computing device displays the live image generated of user 302 by the camera and the directional animation together. In other implementations, the computing device can remove the live image, such as by blacking out the display screen, and display the directional animation in place of the live image. For instance, the computing device can display the live image up to a point in which the user activates the image capture control, at which point the live image is replaced with the directional animation for a predetermined amount of time until the still image is captured. Accordingly, various implementations can overlay the directional animation on top of live image and/or replace the live image with the directional animation.

Directional animations can take any suitable form and/or include any suitable combination of computer-generated images. To further illustrate, consider now FIG. 5 that includes computing device 500. In various implementations, computing device 500 is representative of computing device 102 of FIG. 1. Similar to the scenario described with respect to computing device 400 of FIG. 4, computing device 500 displays directional animation 502 upon detecting an image capture event to provide a visual cue that directs a user's attention or eye to a camera lens. To provide additional detail, the lower portion of FIG. 5 includes sequential views of computing device 500 at various points in time. In other words, computing device 500a, computing device 500b, computing device 500c, and computing device 500d each represent computing device 500 at successive points in time, starting from the left and moving to the right. In combination, the computing devices are used to demonstrate the animated nature of directional animation 502.

Figure 5:
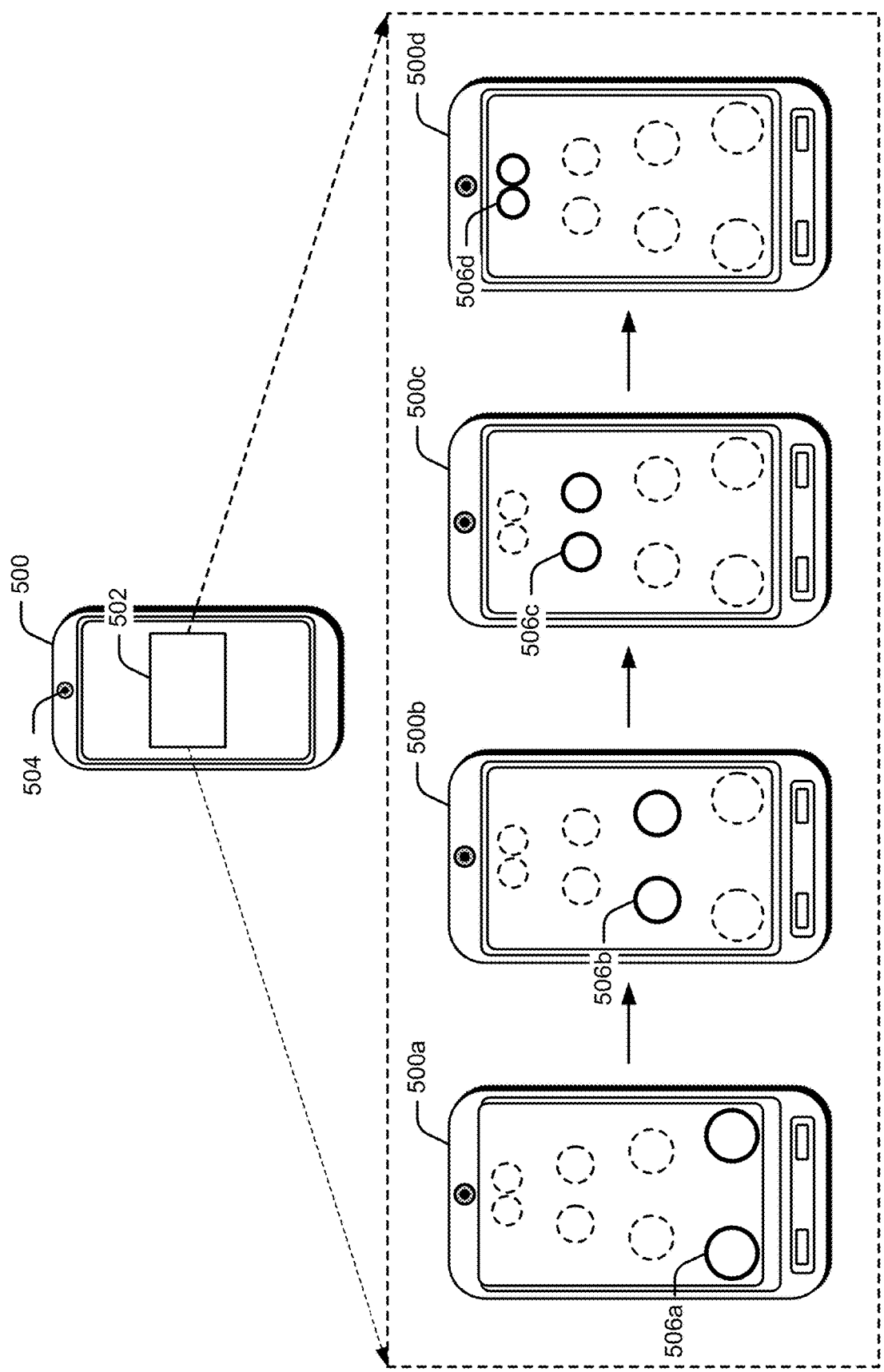
FIG. 5 illustrates an example directional animation used during image capture in accordance with one or more implementations.

In FIG. 5, directional animation 502 presents a grouping of computer-generated shapes in which the animation alternates which particular shapes in the grouping are highlighted and/or emphasized. In FIG. 5, the pattern alternates which shape pair is highlighted more than other shape pairs to form a visual cue similar to runway lighting that progresses along a line towards an end destination (e.g., front-facing camera 504). For instance, computing device 500a, by way of directional animation 502, first highlights shape pair 506a to emphasize the bottom-most pair of lights over the other shape pairs. Shape pair 506a can be emphasized in any suitable manner, such as by altering the color of shape pair 506a to something different than the other shape pairs, dimming the lighting of the other shape pairs relative to shape pair 506a, and so forth. Other implementations visually remove the other shape pairs from the display to present shape pair 506a on the display without other shape pairs.

After shape pair 506a has been emphasized relative to the other shape pairs, the animation progresses to computing device 500b, and emphasizes shape pair 506b over the other shape pairs. This can include visually removing any emphasis and/or display of shape pair 506a presented at computing device 500a, such as by dimming shape pair 506a relative to shape pair 506b and/or visually removing shape pair 506a from the display. In a similar manner, the animation proceeds to computing device 500c, where shape pair 506c is visually emphasized over the other shape pairs, and then to computing device 500d, where shape pair 506d is visually emphasized over the other shape pairs. In viewing the combination over time, the visual alterations provided by directional animation 502 present an animation that renders moving lights that begin at the bottom of computing device 500 and move in a direction towards front-facing camera 504, and thus drawing the user's eye towards the corresponding lens.

Figure 6:
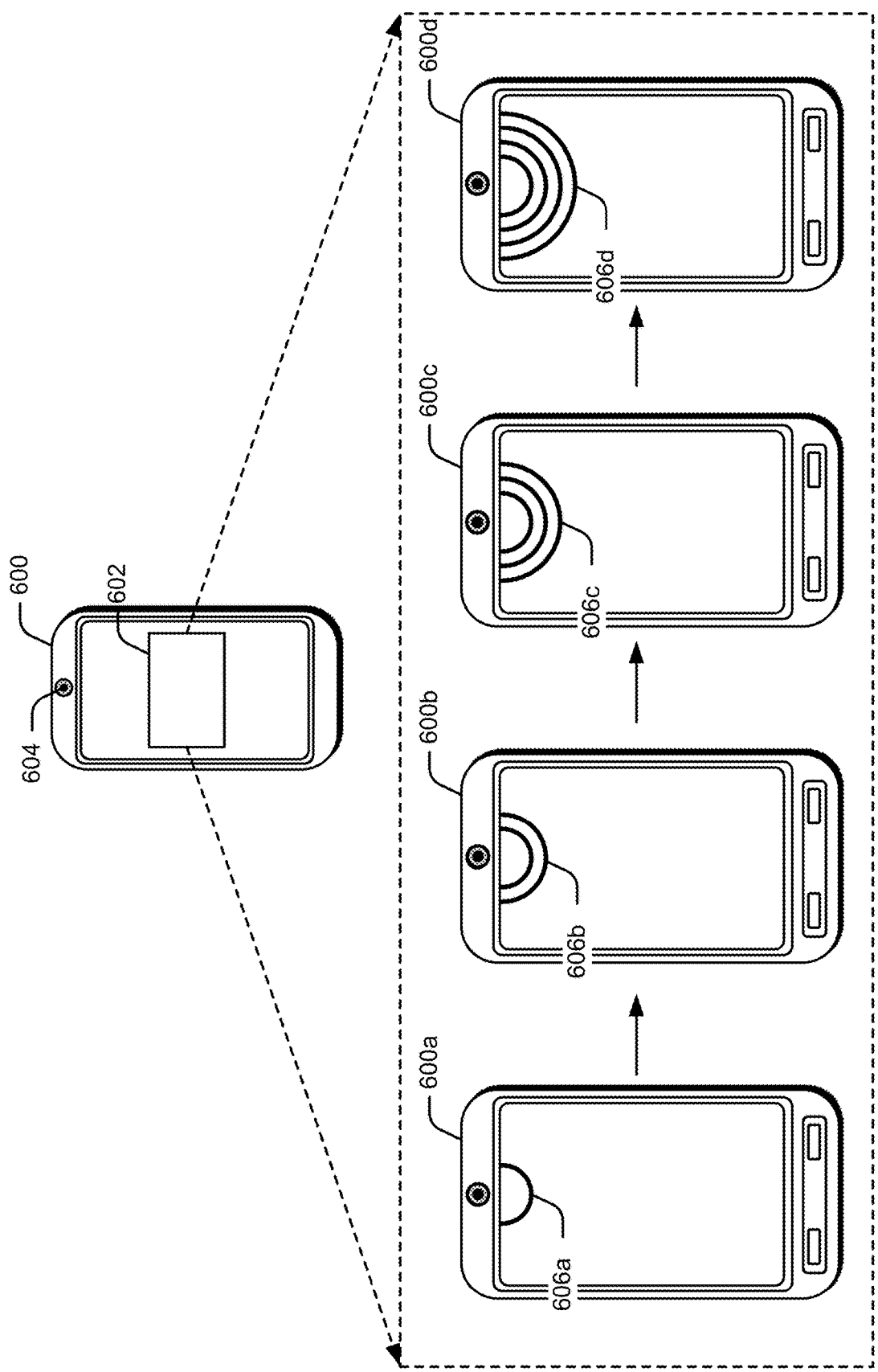
FIG. 6 illustrates an example directional animation used during image capture in accordance with one or more implementations.

As another example, consider now FIG. 6 that includes computing device 600. In various implementations, computing device 600 is representative of computing device 102 of FIG. 1. Similar to the scenarios described with respect FIG. 4 and/or FIG. 5, computing device 600 displays directional animation 602 in response to detecting an image capture event as a way to provide a visual cue to direct a user's attention or eye to a camera lens. To provide additional detail, the lower portion of FIG. 6 includes sequential views of computing device 600 at various points in time that together demonstrate the animated nature of directional animation 602. In other words, computing device 600a, computing device 600b, computing device 600c, and computing device 600d each represent computing device 600 at successive points in time, starting from the left and moving to the right.

In FIG. 6, directional animation 602 displays concentric semi-circles around front-facing camera 604 as a way to draw a user's eye towards the corresponding lens. In this example, instead of displaying an animation moving towards the lens, directional animation 602 displays an animation that is anchored at a location corresponding to the lens, and radiates outwardly from the anchored location. Thus, computing device 600a, by way of directional animation 602, first displays semi-circle 606a, then moves to computing device 600b which adds semi-circle 606b to the display. The animation proceeds to computing device 600c in which semi-circle 606c is added to the display, followed by semi-circle 606d added at computing device 600d. Upon displaying semi-circle 606d, various implementations repeat and/or replay the animation as further described herein. In this example, directional animation 602 adds content to the display over the progression of the animation (e.g., first semi-circle 606a, then semi-circle 606b, etc.). However, it is to be appreciated that other implementations, alternate the content that is radiated outwardly, such as first displaying semi-circle 606a, then removing semi-circle 606a and adding semi-circle 606b, etc.

Figure 7:
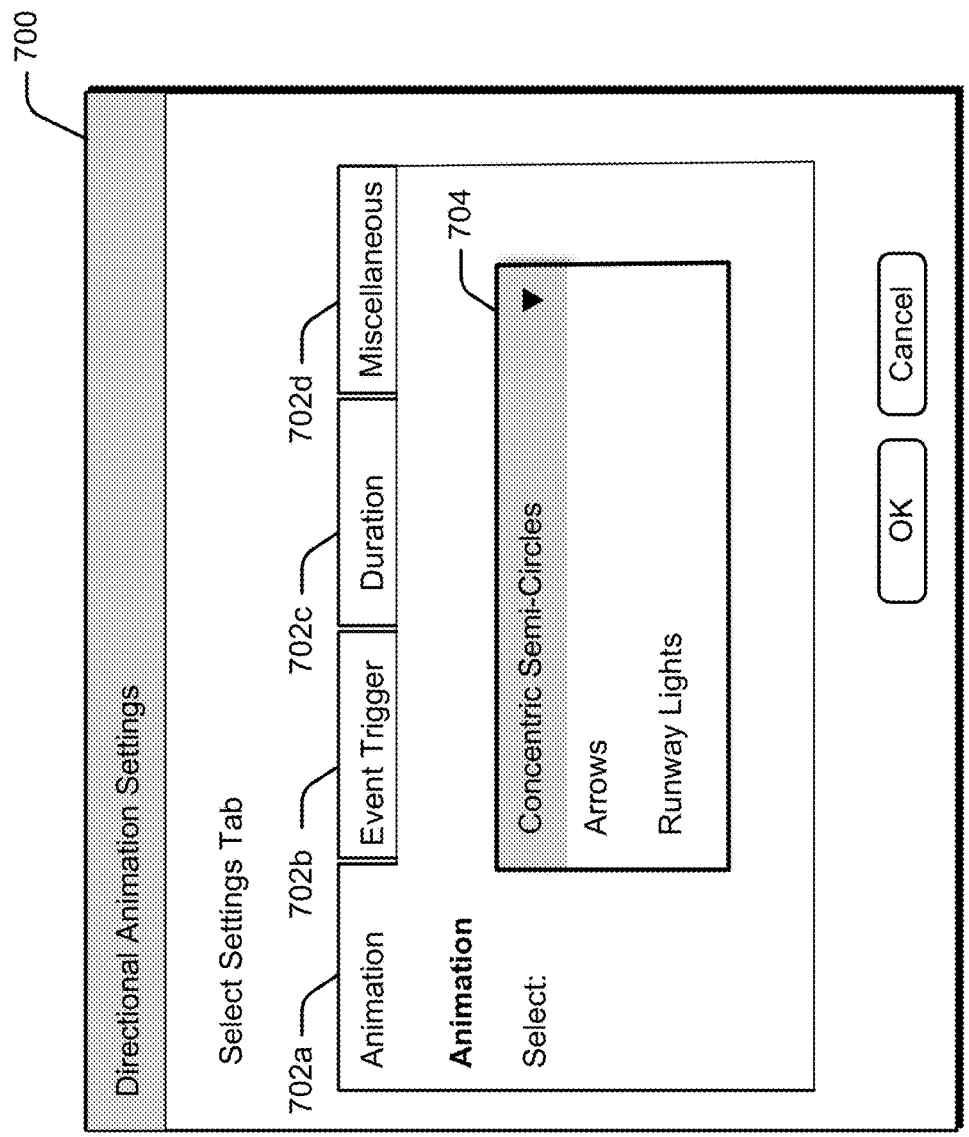
FIG. 7 illustrates an example user interface associated configuring a directional animation in accordance with one or more implementations.

Various implementations use default and/or fixed configurations to govern the display of a directional animation. Alternately or additionally, a user can configure which directional animation is displayed and/or various associated playback configuration settings. To demonstrate, consider now FIG. 7 that illustrates an example user interface 700. In some implementations, directional animation module 110 of FIG. 1 displays user interface 700 as a way to expose various configuration settings. In FIG. 7, user interface 700 includes four selectable tabs: animation tab 702a, event trigger tab 702b, duration tab 702c, and miscellaneous tab 702d. Animation tab 702a includes pull-down menu 704 that displays multiple selectable options for what is displayed as the directional animation. In this example, pull-down menu 704 includes three selections "Concentric Semi-Circles", "Arrows", and "Runway Lights", but any other number and/or combination of animations can be included in pull-down menu 704 without departing from the scope of the claimed subject matter. As one example, some implementations of pull-down menu 704 can include a "Browse" selection that enables a user to navigate to file locations on a computing device and select various animation files. Through pull-down menu 704, a user can enter input to customize which directional animation a computing device displays during image captures as further described herein.

Event trigger tab 702b represents a configuration screen in which the user can customize what type of image capture events trigger the display of a directional animation, such as "front-facing camera activation", "rear-facing camera activation", "facial recognition", "image capture control activation", and so forth. Duration tab 702c represents a configuration screen in which the user can customize the duration of a directional animation, such as "continuous repeat mode", "5 repeats", "10 second duration", "terminate on user event XYZ", and so forth. The term XYZ is used here to denote that any suitable user event can be used to trigger the termination of playback as further described herein. Finally, miscellaneous tab 702 represents a configuration screen that enables a user to customize other configuration settings associated with the playback of a directional animation, such as brightness, color preferences, and so forth. Thus, various implementations provide the user with the ability to configure various aspects of a directional animation displayed during image capture.

By using a directional animation to draw a user's eye towards a camera lens, various implementations improve image quality relative to other image capture techniques. In various implementations, "image quality" refers to user-preferred images having a higher quality relative to other images, such as a user-preferred image where a user is looking directly at the camera instead of elsewhere. To demonstrate, consider a scenario in which a user attempts to capture an image of multiple people via a front-facing camera. By providing a directional animation, each person receives a visual clue that corresponds to a location of the camera lens, thus increasing the probability that each person will be directly looking at the lens at the moment of image capture.

Figure 8:
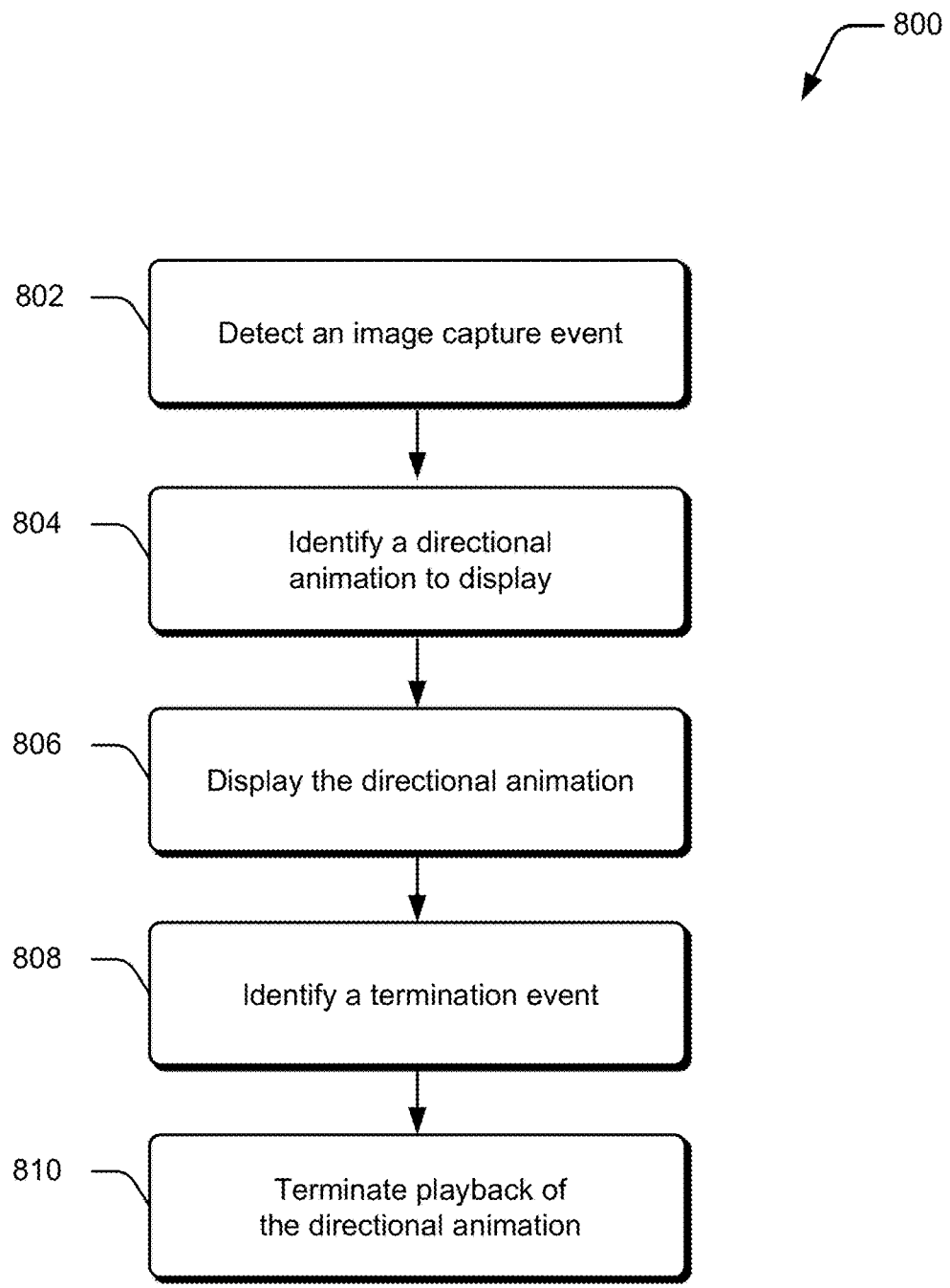
FIG. 8 illustrates a flow diagram that determines to display a directional animation in accordance with one or more implementations.

FIG. 8 illustrates an example method 800 that provides a directional animation during image capture in accordance with one or more implementations. The method can be performed by any suitable combination of hardware, software, and/or firmware. In at least some embodiments, aspects of the method can be implemented by one or more suitably configured hardware components and/or software modules, such as directional animation module 110 of FIG. 1. While the method described in FIG. 8 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 802, various implementations detect an image capture event. This can include any type of image capture event, such as activation of a camera, receiving selection of an image capture control, identifying a particular facial characteristic in a live image, and so forth. Some implementations are configured to detect a default and/or fixed image capture event. Alternately or additionally, various implementations can detect user-customized the image capture events as further described herein.

In response to detecting the image capture event, various implementations identify a directional animation to display at 804. For instance, the directional animation module can use default settings that identify the directional animation to display and/or what playback parameters to use, such as how often to play the animation, what event to use as a termination event, a repeat count, a timer setting, and so forth. Alternately or additionally, various implementations identify which directional animation by applying user-defined configuration settings.

Upon identifying the directional animation module, various implementations display the directional animation at 806. Directional animations can include any suitable type of computer-generated image that highlights or emphasizes a location associated with a camera lens. Some animations include images that visually move towards the camera lens, while other animations are anchored to the location and display moving images from the anchored location, such as semi-circles that radiate outwardly. Various locations associated with the camera lens are generally located at the camera lens in that the location is close or near the lens at, or within, a predetermined distance to the lens. For example, various display devices are devoid of display electronics at an exact location that includes the camera lens, thus making display of an animation at the exact location difficult. Accordingly, various implementations select a general location that is closer to, or nearer to, the camera lens relative to other locations. The display of the directional animation can be overlaid on top of a live image generated by a camera and/or can replace the live image to only display the directional animation.

At 808, various implementations identify a termination event. This can include user-defined termination events identified and/or default termination events as further described herein. In response to identifying the termination event, playback of the directional animation is terminated at 810.

Figure 9:
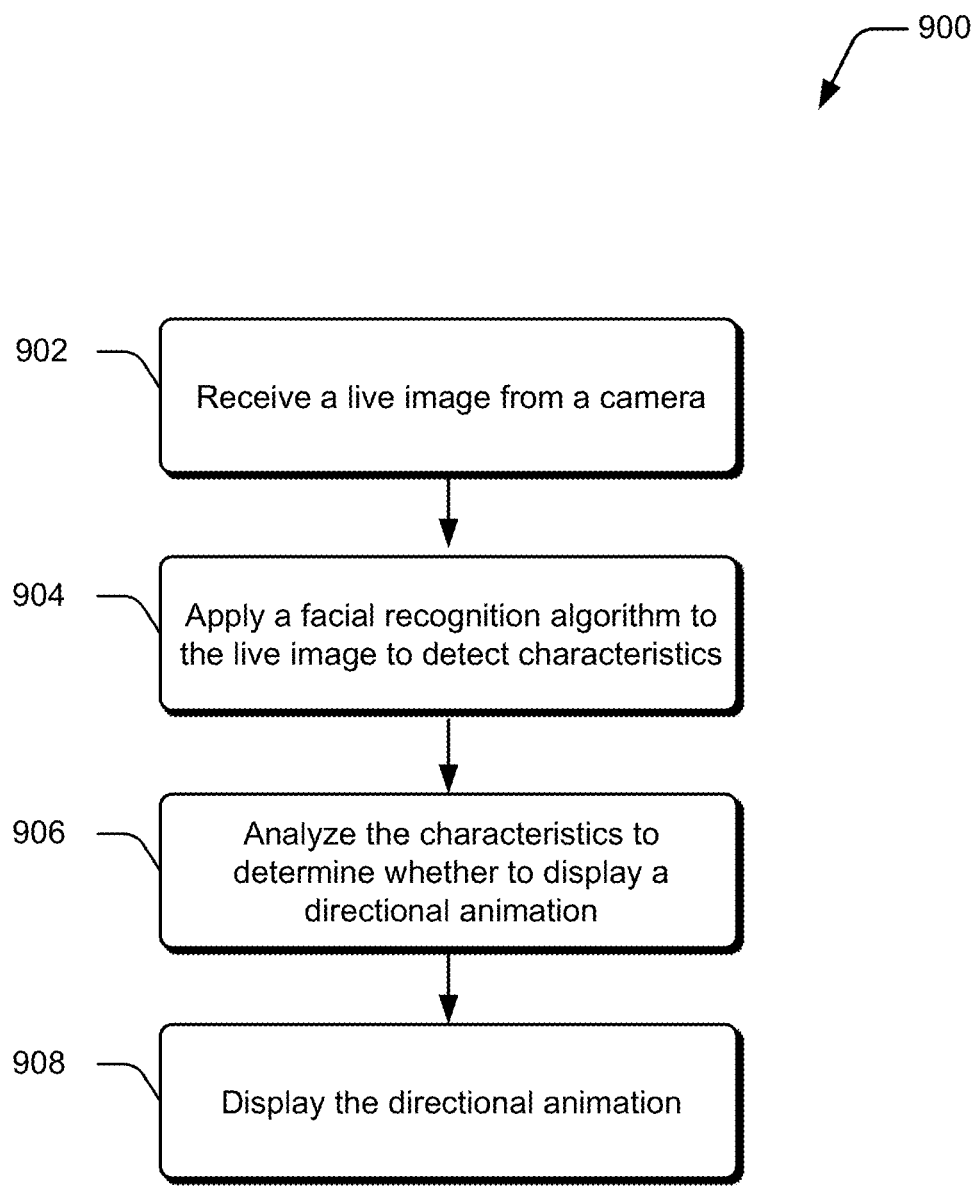
FIG. 9 illustrates a flow diagram that determines to display a directional animation in accordance with one or more implementations.

FIG. 9 illustrates an example method 900 that provides a directional animation based upon facial recognition techniques in accordance with one or more implementations. The method can be performed by any suitable combination of hardware, software, and/or firmware. In at least some embodiments, aspects of the method can be implemented by one or more suitably configured hardware components and/or software modules, such as directional animation module 110 of FIG. 1. While the method described in FIG. 9 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 902, the directional animation module receives a live image from a camera, such as a front-facing camera activated by the user. In response to receiving the live image, various implementations apply a facial recognition algorithm to the live image at 904 as a way to detect various characteristics. For instance, the facial recognition algorithm can first determine a position of one or more faces in the live image. Upon identifying the face(s), the facial recognition algorithm can determine various landmarks and/or features of the face, such as eye positioning, a gaze direction, and so forth. For instance, in a scenario in which the facial recognition algorithm identifies multiple faces, various implementations identify a respective gaze direction for each identified face.

At 906, the directional animation module analyzes the characteristics to determine whether to display a directional animation. Various implementations analyze eye positioning and/or gaze positioning to identify gazes directed elsewhere besides directly at a corresponding camera lens (e.g., to the left of the camera lens, to the right of the camera lens, below the camera lens, etc.). This can include identifying that a single gaze out of multiple identified gazes in a live image with multiple people is directed elsewhere. Accordingly, the analysis can include comparing these various characteristics to a baseline and/or predetermined threshold that is used in the analysis to trigger display the directional animation. For instance, the analysis can include a gaze threshold, such as a percentage-off-center value that indicates to trigger the display of the directional animation in response to detecting that a gaze characterized in the live image meets or exceeds the percentage-off-center value. The phrase "percentage-off-center" denotes any suitable metric that quantifies how far away a gaze is from directly looking at a camera, such as a percentage of deviation from center. In response to the analysis, various implementations display the directional animation at 908. This can include displaying the directional animation for a predetermined time period, until a user activates the image capture control, for a time period after activation of the image capture control, and so forth, as further described herein.

Having described various examples of directional animations during image capture, consider now a discussion of an example device in which can be used for various implementations.

Example Device

Figure 10:
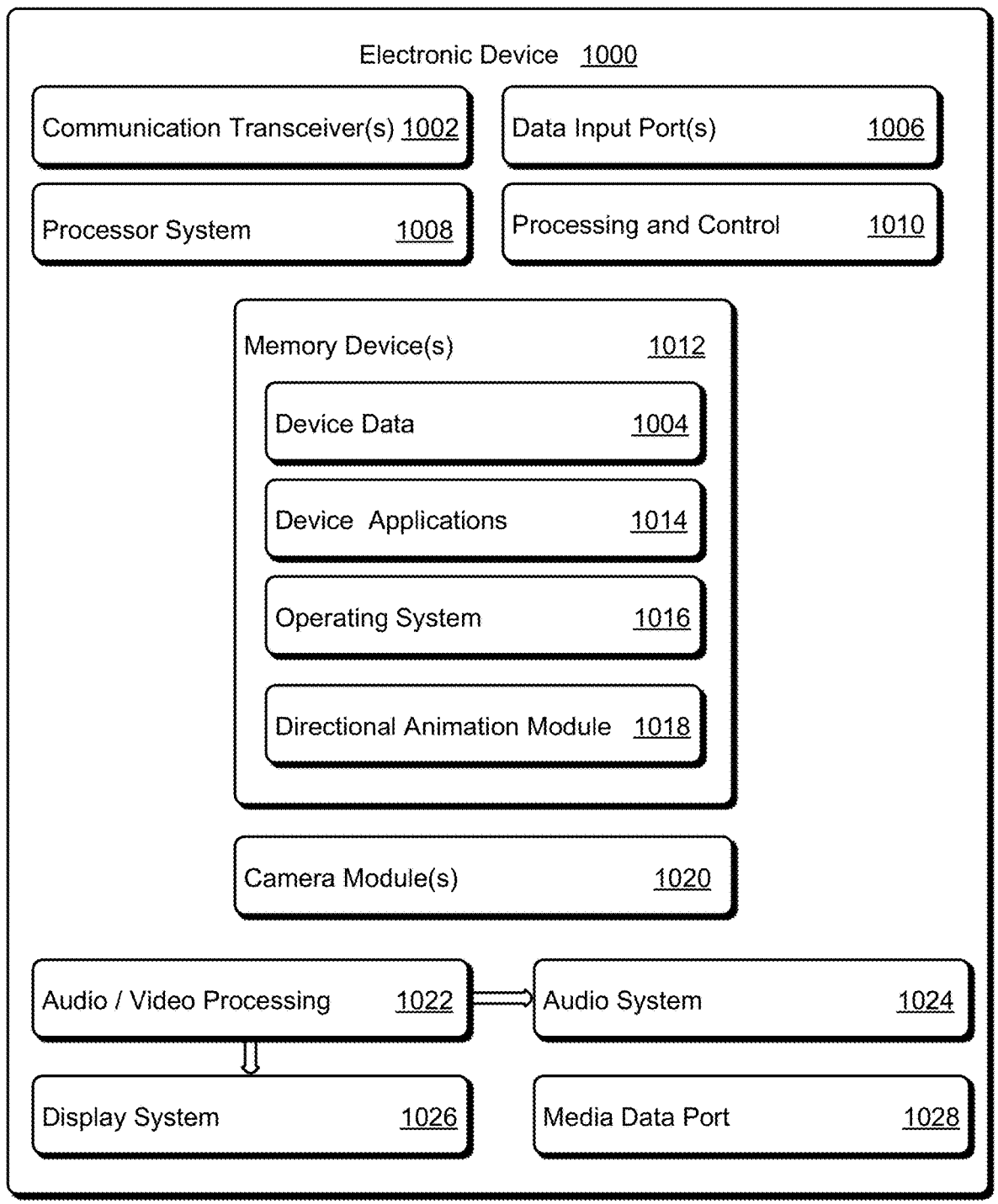
FIG. 10 is an illustration of an example device in accordance with one or more implementations.

FIG. 10 illustrates various components of an example electronic device 1000, such as computing device 102 of FIG. 1, which can be utilized to implement various aspects as further described herein. Electronic device 1000 can be, or include, many different types of devices capable of realizing directional animations during image capture in accordance with one or more implementations.

Electronic device 1000 includes communication transceivers 1002 that enable wired or wireless communication of device data 1004, such as received data and transmitted data. While referred to as a transceiver, it is to be appreciated that communication transceivers 1002 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Electronic device 1000 may also include one or more data-input ports 1006 via which any type of data, media content, and inputs can be received, such as user-selectable inputs, messages, music, television content, recorded video content, and any other type of audio, video, or image data received from any content or data source. Data-input ports 1006 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Electronic device 1000 of this example includes processor system 1008 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 1010. Although not shown, electronic device 1000 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 1000 also includes one or more memory devices 1012 that enable data storage, examples of which include random access memory (RAM), non-volatile memory (e.g., read-only memory (ROM), flash memory, EPROM, EEPROM, etc.), and a disk storage device. Memory devices 1012 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 1012 provide data storage mechanisms to store the device data 1004, other types of information or data, and various device applications 1014 (e.g., software applications). For example, operating system 1016 can be maintained as software instructions within memory devices 1012 and executed by processor system 1008.

In some aspects, memory devices 1012 includes directional animation module 1018. However, while illustrated and described as residing within memory devices 1012, other implementations of directional animation module 1018 can alternately or additionally include software, firmware, hardware, or any combination thereof.

Directional animation module 1018 initiates the display and/or playback of a directional animation configured to move a user's gaze and/or focus towards a camera lens as further described herein. Alternately or additionally, directional animation module 1018 monitors for various events, and, in response to identifying the events, terminates the display and/or playback of the directional animation. Various implementations of directional animation module 1018 provide a user interface that enables user customization of the directional animation.

Electronic device 1000 also includes camera module(s) 1020 that enable image capture of scenes external to the electronic device, such as a front-facing camera and/or a rear-facing camera. Various implementations of the camera modules 1020 interface with software and/or firmware to provide various notifications to directional animation module 1018. For instance, camera module 1020 can interface with a software driver and/or operating system 1016 to send notifications signifying that an image capture has occurred, a particular camera has been activated, and so forth.

Electronic device 1000 also includes audio and video processing system 1022 that processes audio data and passes through the audio and video data to audio system 1024. Audio system 1024 and display system 1026 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as media-data port 1028. In some implementations, audio system 1024 and display system 1026 are external components to electronic device 1000. Alternatively, or additionally, audio system 1024 and/or display system 1026 can be an integrated component of the example electronic device 1000, such as part of an integrated speaker and/or an integrated display and touch interface.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

We claim:

1. A computing device comprising:
   a camera device to capture images of a user of the computing device;

a display device to display a live image of the user prior to a user image being captured by the camera device;

a processor system to implement a directional animation module at least partially in computer hardware to:

detect activation of the camera device as an image capture event prior to a user image being captured with the camera device, the live image of the user being displayable on the display device responsive to the activation of the camera device;

initiate an animated display of a directional animation on the display device replacing the live image of the user, the directional animation displayable as a visual cue to direct user attention to a camera lens of the camera device prior to the user image being captured;

detect a user input associated with activation of an image capture control to capture the user image; and terminate the animated display of the directional animation in response to the activation of the image capture control to capture the user image.

2. The computing device as recited in claim 1, wherein the directional animation module is implemented to identify the directional animation to display based on one or more configuration settings that are selectable to modify an appearance of the directional animation, the one or more configuration settings including a playback parameter to repeat the animated display of the directional animation until the activation of the image capture control.

3. The computing device as recited in claim 1, wherein the animated display of the directional animation is displayable as a computer-generated image that is first displayed on an opposite side of the display device relative to the camera lens of the camera device, and the computer-generated image appears to visually move across the display device towards the camera lens.

4. The computing device as recited in claim 1, wherein the directional animation module is implemented to:

control the animated display of the directional animation for a predetermined time period after the user input associated with the activation of the image capture control is detected; and remove the animated display of the directional animation from the display device after the predetermined time period.

5. The computing device as recited in claim 1, wherein the directional animation module is implemented to control display timing of the animated display of the directional animation as a computer-generated image that displays closest to the camera device relative to other computer-generated images in the directional animation.

6. The computing device as recited in claim 1, wherein a captured user image is displayed on the display device after the animated display of the directional animation is terminated and the image capture control is activated.

7. The computing device as recited in claim 1, wherein the camera device is a front-facing camera and the directional animation module is implemented to detect the activation of the front-facing camera.

8. A method implemented by a computing device, the method comprising:

detecting activation of a camera device as an image capture event prior to a still image being captured with the camera device;

displaying a live image on a display device responsive to the detecting the activation of the camera device and prior to the still image being captured;

displaying an animated display of a directional animation on the display device replacing the live image, the directional animation displayed as a visual cue to locate a camera lens of the camera device prior to the still image being captured;

detecting a user input associated with activating an image capture control to capture the still image; and terminating the animated display of the directional animation in response to the detecting the user input activating the image capture control to capture the still image.

9. The method as recited in claim 8, further comprising identifying the directional animation to display based on one or more configuration settings that are selectable to modify an appearance of the directional animation, the one or more configuration settings including a playback parameter to repeat the animated displaying of the directional animation until the activating of the image capture control.

10. The method as recited in claim 8, wherein the displaying the animated display of the directional animation comprises:

displaying a computer-generated image that is first displayed on an opposite side of the display device relative to the camera lens of the camera device; and subsequently displaying the computer-generated image to appear as visually moving across the display device towards the camera lens.

11. The method as recited in claim 8, further comprising:

displaying the animated display of the directional animation for a predetermined time period after the detecting the user input activating the image capture control to capture the still image; and removing the animated display of the directional animation from the display device after the predetermined time period.

12. The method as recited in claim 8, further comprising:

controlling timing of the displaying the animated display of the directional animation as a computer-generated image that displays closest to the camera device relative to other computer-generated images in the directional animation.

13. The method as recited in claim 8, further comprising:

displaying a captured still image on the display device after the animated display of the directional animation is terminated and the image capture control is activated.

14. The method as recited in claim 8, wherein the camera device is a front-facing camera and the detecting the image capture event comprises detecting activation of the front-facing camera.

15. One or more computer-readable storage devices comprising processor executable instructions which, responsive to execution by one or more processors, cause the one or more processors to implement a directional animation module that performs operations comprising:

detecting activation of a camera device as an image capture event prior to a still image being captured with the camera device, a live image being displayed on a display device responsive to the detecting the activation of the camera device and prior to the still image being captured;

identifying a directional animation to display based on one or more configuration settings that are selectable to modify an appearance of the directional animation; and replacing the live image with an animated display of the directional animation, the directional animation displayed as a visual cue to locate a camera lens of the camera device prior to the still image being captured.

16. The one or more computer-readable storage devices as recited in claim 15, wherein the replacing the live image with the animated display of the directional animation comprises:
- a computer-generated image that is first displayed on an opposite side of the display device relative to the camera lens of the camera device; and
- the computer-generated image subsequently displayed to appear as visually moving across the display device towards the camera lens.

17. The one or more computer-readable storage devices as recited in claim 15, further comprising:
- detecting a user input associated with activating an image capture control to capture the still image; and
- removing the animated display of the directional animation from the display device responsive to the detecting the user input activating the image capture control to capture the still image.

18. The computing device as recited in claim 1, wherein the directional animation module is implemented to add displayable content to the animated display of the directional animation on the display device.

19. The method as recited in claim 8, further comprising receiving a user selection of a brightness value, and wherein the displaying the animated display of the directional animation includes configuring the directional animation according to the brightness value.

20. The one or more computer-readable storage devices as recited in claim 15, wherein the replacing the live image with the animated display of the directional animation comprises:
- removing the live image from displaying on the display device;
- blacking out the display device; and
- displaying the animated display of the directional animation on the display device.

* * * * *